United States Patent
Kim et al.

(10) Patent No.: US 8,780,957 B2
(45) Date of Patent: Jul. 15, 2014

(54) OPTIMAL WEIGHTS FOR MMSE SPACE-TIME EQUALIZER OF MULTICODE CDMA SYSTEM

(75) Inventors: Byoung-Hoon Kim, San Diego, CA (US); Manuel Flury, Aesch/BL (CH); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 645 days.

(21) Appl. No.: 11/284,601

(22) Filed: Nov. 21, 2005

(65) Prior Publication Data

US 2006/0159160 A1 Jul. 20, 2006

Related U.S. Application Data

(60) Provisional application No. 60/643,814, filed on Jan. 14, 2005, provisional application No. 60/658,265, filed on Mar. 2, 2005.

(51) Int. Cl.
*H04B 1/69* (2006.01)

(52) U.S. Cl.
USPC .......................................... 375/147; 375/130

(58) Field of Classification Search
USPC ......... 375/147, 130, 148, 347, 260, 316, 299, 375/229; 455/101, 132
See application file for complete search history.

(56) References Cited

U.S. PATENT DOCUMENTS

| | | |
|---|---|---|
| 5,289,276 A | 2/1994 | Siracusa et al. |
| 5,508,752 A | 4/1996 | Kim et al. |
| 5,565,920 A | 10/1996 | Lee et al. |
| 5,598,428 A * | 1/1997 | Sato ............................... 375/148 |
| 5,619,272 A | 4/1997 | Salmon et al. |
| 5,642,294 A | 6/1997 | Taniguchi et al. |
| 5,642,460 A | 6/1997 | Shimoda |
| 5,654,805 A | 8/1997 | Boon |
| 5,682,204 A | 10/1997 | Uz et al. |
| 5,684,917 A | 11/1997 | Yanagihara et al. |
| 5,686,962 A | 11/1997 | Chung et al. |
| 5,699,119 A | 12/1997 | Chung et al. |
| 5,745,645 A | 4/1998 | Nakamura et al. |

(Continued)

FOREIGN PATENT DOCUMENTS

| | | |
|---|---|---|
| CL | 01332005 | 10/2005 |
| CL | 10432005 | 12/2005 |

(Continued)

OTHER PUBLICATIONS

International Search Report—PCT/US2006/023210, International Search Authority—US Patent Office—Feb. 26, 2007.

(Continued)

*Primary Examiner* — Khai Tran
(74) *Attorney, Agent, or Firm* — Charles E. Eggers

(57) ABSTRACT

Aspects of the invention provide an enhanced chip-level linear space-time equalizer 118 for multiple-input-multiple-output (MIMO) multi-code CDMA systems reusing same spreading codes in different transmit antennas 114. Reuse of the spreading codes at the transmitter 104, 204 creates an on-time inter-stream interference component (or cross-talk among distinct transmit antenna signals) which reuse the same spreading code as the desired signal in the soft metric sequence of the MIMO CDMA receiver after MMSE space-time equalization. The equalizer 118 has a MMSE weighting vector that takes the despreading effect into account.

16 Claims, 6 Drawing Sheets

(56) References Cited

U.S. PATENT DOCUMENTS

| | | |
|---|---|---|
| 5,754,233 A | 5/1998 | Takashima |
| 5,771,357 A | 6/1998 | Kato et al. |
| 5,790,179 A | 8/1998 | Shibata et al. |
| 5,793,895 A | 8/1998 | Chang et al. |
| 5,801,765 A | 9/1998 | Gotoh et al. |
| 5,821,991 A | 10/1998 | Kwok |
| 5,835,163 A | 11/1998 | Liou et al. |
| 5,841,939 A | 11/1998 | Takahashi et al. |
| 5,864,369 A | 1/1999 | Swan |
| 5,929,902 A | 7/1999 | Kwok |
| 5,960,148 A | 9/1999 | Miyazawa |
| 5,978,029 A | 11/1999 | Boice et al. |
| 5,991,502 A | 11/1999 | Kawakami et al. |
| 6,012,091 A | 1/2000 | Boyce |
| 6,014,493 A | 1/2000 | Shimoda |
| 6,064,796 A | 5/2000 | Nakamura et al. |
| 6,091,460 A | 7/2000 | Hatano et al. |
| 6,115,499 A | 9/2000 | Wang et al. |
| 6,157,674 A | 12/2000 | Oda et al. |
| 6,175,593 B1 | 1/2001 | Kim et al. |
| 6,229,925 B1 | 5/2001 | Alexandre et al. |
| 6,317,518 B1 | 11/2001 | Enari |
| 6,333,950 B1 | 12/2001 | Karasawa |
| 6,363,114 B1 | 3/2002 | Kato |
| 6,370,672 B1 | 4/2002 | Rick et al. |
| 6,449,002 B1 | 9/2002 | Markman et al. |
| 6,473,459 B1 | 10/2002 | Sugano et al. |
| 6,490,320 B1 | 12/2002 | Vetro et al. |
| 6,501,796 B1 | 12/2002 | Dusseux et al. |
| 6,507,618 B1 | 1/2003 | Wee et al. |
| 6,538,688 B1 | 3/2003 | Giles |
| 6,539,220 B1 | 3/2003 | Sakai et al. |
| 6,553,068 B1 | 4/2003 | Wake et al. |
| 6,574,211 B2 | 6/2003 | Padovani et al. |
| 6,580,829 B1 | 6/2003 | Hurst, Jr. et al. |
| 6,600,836 B1 | 7/2003 | Thyagarajan et al. |
| 6,718,121 B1 | 4/2004 | Shikunami |
| 6,721,492 B1 | 4/2004 | Togashi |
| 6,724,819 B1 | 4/2004 | Takaki et al. |
| 6,744,474 B2 | 6/2004 | Markman |
| 6,773,437 B2 | 8/2004 | Ogilvie et al. |
| 6,784,942 B2 | 8/2004 | Selby et al. |
| 6,791,602 B1 | 9/2004 | Sasaki et al. |
| 6,798,834 B1 | 9/2004 | Murakami et al. |
| 6,891,891 B2 | 5/2005 | Pau et al. |
| 6,900,846 B2 | 5/2005 | Lee et al. |
| 6,904,081 B2 * | 6/2005 | Frank ............................ 375/152 |
| 6,909,745 B1 | 6/2005 | Puri et al. |
| 6,928,151 B2 | 8/2005 | Yamada et al. |
| 6,934,335 B2 | 8/2005 | Liu et al. |
| 6,952,500 B2 | 10/2005 | Sheraizin et al. |
| 6,959,044 B1 | 10/2005 | Jin et al. |
| 6,970,506 B2 | 11/2005 | Kim et al. |
| 6,985,635 B2 | 1/2006 | Chen et al. |
| 6,987,728 B2 | 1/2006 | Deshpande |
| 6,996,186 B2 | 2/2006 | Ngai et al. |
| 7,009,656 B2 | 3/2006 | Thomson et al. |
| 7,027,512 B2 | 4/2006 | Jeon |
| 7,039,855 B2 | 5/2006 | Nikitin et al. |
| 7,042,512 B2 | 5/2006 | Yang et al. |
| 7,075,581 B1 | 7/2006 | Ozgen et al. |
| 7,089,313 B2 | 8/2006 | Lee et al. |
| 7,093,028 B1 | 8/2006 | Shao et al. |
| 7,095,874 B2 | 8/2006 | Moskowitz et al. |
| 7,123,816 B2 | 10/2006 | McGrath et al. |
| 7,129,990 B2 | 10/2006 | Wredenhagen et al. |
| 7,136,417 B2 | 11/2006 | Rodriguez |
| 7,139,551 B2 | 11/2006 | Jamadagni |
| 7,142,599 B2 | 11/2006 | Henocq |
| 7,154,555 B2 | 12/2006 | Conklin |
| 7,167,507 B2 * | 1/2007 | Mailaender et al. .......... 375/148 |
| 7,203,236 B2 | 4/2007 | Yamada |
| 7,203,238 B2 | 4/2007 | Liu et al. |
| 7,280,708 B2 | 10/2007 | Song et al. |
| 7,356,073 B2 | 4/2008 | Heikkila |
| 7,359,466 B2 * | 4/2008 | Huang et al. ................... 375/349 |
| 7,430,336 B2 | 9/2008 | Raveendran |
| 7,433,982 B2 | 10/2008 | Peev et al. |
| 7,443,448 B2 | 10/2008 | Yang et al. |
| 7,474,701 B2 | 1/2009 | Boice et al. |
| 7,479,978 B2 | 1/2009 | Cho et al. |
| 7,483,581 B2 | 1/2009 | Raveendran et al. |
| 7,486,736 B2 | 2/2009 | Zhidkov |
| 7,528,887 B2 | 5/2009 | Wyman |
| 7,529,426 B2 | 5/2009 | Neuman |
| 7,536,626 B2 | 5/2009 | Sutivong et al. |
| 7,557,861 B2 | 7/2009 | Wyman |
| 7,634,260 B2 | 12/2009 | Chun |
| 7,660,987 B2 | 2/2010 | Baylis et al. |
| 7,676,106 B2 | 3/2010 | Panusopone et al. |
| 7,705,913 B2 | 4/2010 | Jia et al. |
| 7,738,716 B2 | 6/2010 | Song |
| 7,840,112 B2 | 11/2010 | Rao |
| 8,060,720 B2 | 11/2011 | Uppala |
| 2001/0001614 A1 | 5/2001 | Boice et al. |
| 2001/0017888 A1 | 8/2001 | Bruls |
| 2001/0055337 A1 | 12/2001 | Matsuzaki et al. |
| 2002/0012396 A1 | 1/2002 | Pau et al. |
| 2002/0021485 A1 | 2/2002 | Pilossof |
| 2002/0047936 A1 | 4/2002 | Tojo |
| 2002/0054621 A1 * | 5/2002 | Kyeong et al. ................. 375/147 |
| 2002/0097791 A1 | 7/2002 | Hansen |
| 2002/0146071 A1 | 10/2002 | Liu et al. |
| 2002/0149703 A1 | 10/2002 | Adams et al. |
| 2002/0150162 A1 | 10/2002 | Liu et al. |
| 2002/0154705 A1 | 10/2002 | Walton et al. |
| 2002/0163964 A1 | 11/2002 | Nichols |
| 2002/0196362 A1 | 12/2002 | Yang et al. |
| 2003/0021485 A1 | 1/2003 | Raveendran et al. |
| 2003/0071917 A1 | 4/2003 | Selby et al. |
| 2003/0076908 A1 | 4/2003 | Huang et al. |
| 2003/0142762 A1 | 7/2003 | Burke |
| 2003/0160899 A1 | 8/2003 | Ngai et al. |
| 2003/0169933 A1 | 9/2003 | Song et al. |
| 2003/0219160 A1 | 11/2003 | Song et al. |
| 2003/0227977 A1 | 12/2003 | Henocq |
| 2004/0012685 A1 | 1/2004 | Thomson et al. |
| 2004/0013196 A1 | 1/2004 | Takagi et al. |
| 2004/0045038 A1 | 3/2004 | Duff et al. |
| 2004/0073901 A1 | 4/2004 | Imamatsu |
| 2004/0125877 A1 | 7/2004 | Chang et al. |
| 2004/0136566 A1 | 7/2004 | Cho et al. |
| 2004/0190609 A1 | 9/2004 | Watanabe |
| 2004/0192274 A1 | 9/2004 | Vuori |
| 2004/0264790 A1 | 12/2004 | Song et al. |
| 2005/0022178 A1 | 1/2005 | Ghafoor et al. |
| 2005/0062885 A1 | 3/2005 | Kadono et al. |
| 2005/0063475 A1 * | 3/2005 | Li et al. ......................... 375/350 |
| 2005/0076057 A1 | 4/2005 | Sharma et al. |
| 2005/0078750 A1 | 4/2005 | Shen et al. |
| 2005/0081482 A1 | 4/2005 | Lembo |
| 2005/0134735 A1 | 6/2005 | Swartz |
| 2005/0168634 A1 | 8/2005 | Wyman et al. |
| 2005/0168656 A1 | 8/2005 | Wyman et al. |
| 2005/0185719 A1 | 8/2005 | Hannuksela |
| 2005/0192878 A1 | 9/2005 | Minear et al. |
| 2005/0195889 A1 * | 9/2005 | Grant et al. .................... 375/148 |
| 2005/0195899 A1 | 9/2005 | Han |
| 2005/0201478 A1 * | 9/2005 | Claussen et al. ............... 375/261 |
| 2005/0222961 A1 | 10/2005 | Staib et al. |
| 2005/0231635 A1 | 10/2005 | Lin |
| 2005/0249282 A1 | 11/2005 | Landsiedel et al. |
| 2005/0254692 A1 | 11/2005 | Caldwell |
| 2005/0265461 A1 | 12/2005 | Raveendran |
| 2006/0002340 A1 | 1/2006 | Criss et al. |
| 2006/0023788 A1 | 2/2006 | Otsuka et al. |
| 2006/0129646 A1 | 6/2006 | Rhee et al. |
| 2006/0133514 A1 | 6/2006 | Walker |
| 2006/0146934 A1 | 7/2006 | Caglar et al. |
| 2006/0153294 A1 | 7/2006 | Wang et al. |
| 2006/0166739 A1 | 7/2006 | Lin |
| 2006/0197879 A1 | 9/2006 | Covell et al. |
| 2006/0210184 A1 | 9/2006 | Song et al. |
| 2006/0215539 A1 | 9/2006 | Vrcelj et al. |

(56) References Cited

U.S. PATENT DOCUMENTS

| | | |
|---|---|---|
| 2006/0215761 A1 | 9/2006 | Shi et al. |
| 2006/0222078 A1 | 10/2006 | Raveendran |
| 2006/0230162 A1 | 10/2006 | Chen et al. |
| 2006/0233239 A1 | 10/2006 | Sethi et al. |
| 2006/0239347 A1 | 10/2006 | Koul |
| 2006/0244840 A1 | 11/2006 | Eshet et al. |
| 2006/0282737 A1 | 12/2006 | Shi et al. |
| 2007/0014354 A1 | 1/2007 | Murakami et al. |
| 2007/0074266 A1 | 3/2007 | Raveendran et al. |
| 2007/0081586 A1 | 4/2007 | Raveendran et al. |
| 2007/0081587 A1 | 4/2007 | Raveendran et al. |
| 2007/0081588 A1 | 4/2007 | Raveendran et al. |
| 2007/0097259 A1 | 5/2007 | MacInnis et al. |
| 2007/0124443 A1 | 5/2007 | Nanda et al. |
| 2007/0124459 A1 | 5/2007 | Kasama |
| 2007/0160128 A1 | 7/2007 | Tian et al. |
| 2007/0160142 A1 | 7/2007 | Abrams |
| 2007/0171280 A1 | 7/2007 | Tian et al. |
| 2007/0171972 A1 | 7/2007 | Tian et al. |
| 2007/0171986 A1 | 7/2007 | Hannuksela |
| 2007/0206117 A1 | 9/2007 | Tian et al. |
| 2007/0208557 A1 | 9/2007 | Li et al. |
| 2007/0252894 A1 | 11/2007 | Satou et al. |
| 2008/0151101 A1 | 6/2008 | Tian et al. |
| 2009/0074070 A1 | 3/2009 | Yin et al. |
| 2009/0092944 A1 | 4/2009 | Pirker |
| 2009/0122186 A1 | 5/2009 | Rodriguez et al. |
| 2009/0168880 A1 | 7/2009 | Jeon et al. |
| 2009/0244840 A1 | 10/2009 | Takawa et al. |
| 2010/0020886 A1 | 1/2010 | Raveendran et al. |
| 2010/0171814 A1 | 7/2010 | Routhier et al. |
| 2013/0308707 A1 | 11/2013 | RAVEENDRAN; Vijayalakshmi R. et al. |

FOREIGN PATENT DOCUMENTS

| | | |
|---|---|---|
| CL | 10452005 | 12/2005 |
| CL | 14732005 | 1/2006 |
| CL | 5422006 | 8/2006 |
| CL | 05432006 | 8/2006 |
| CL | 05392006 | 11/2006 |
| CL | 5402006 | 11/2006 |
| CL | 5442006 | 2/2007 |
| CL | 02052001 | 12/2008 |
| CN | 1328747 A | 12/2001 |
| CN | 1372769 | 10/2002 |
| CN | 1383327 A | 12/2002 |
| CN | 1395800 A | 2/2003 |
| CN | 1436423 A | 8/2003 |
| CN | 1647540 A | 7/2005 |
| CN | 1669314 A | 9/2005 |
| EP | 0547460 A1 | 6/1993 |
| EP | 0644695 | 3/1995 |
| EP | 0690617 A2 | 1/1996 |
| EP | 0946054 A1 | 9/1999 |
| EP | 1005227 | 5/2000 |
| EP | 1022667 A2 | 7/2000 |
| EP | 1164792 A2 | 12/2001 |
| EP | 1168731 A1 | 1/2002 |
| EP | 1195992 A1 | 4/2002 |
| EP | 1209624 A1 | 5/2002 |
| EP | 1265373 A2 | 12/2002 |
| EP | 1505488 A1 | 2/2005 |
| EP | 1547016 A1 | 6/2005 |
| EP | 1615447 A1 | 1/2006 |
| EP | 1657835 A1 | 5/2006 |
| FR | 2646047 A1 | 10/1990 |
| JP | 3189292 A | 8/1991 |
| JP | 5064175 A | 3/1993 |
| JP | 7222145 A | 8/1995 |
| JP | H07203433 A | 8/1995 |
| JP | 7298272 A | 11/1995 |
| JP | 7312756 A | 11/1995 |
| JP | 8046969 A | 2/1996 |
| JP | 8130716 A | 5/1996 |
| JP | 08214210 | 8/1996 |
| JP | 8251594 A | 9/1996 |
| JP | 09018782 | 1/1997 |
| JP | H09503890 A | 4/1997 |
| JP | 10013826 A | 1/1998 |
| JP | 10302396 A | 11/1998 |
| JP | 10313463 A | 11/1998 |
| JP | H114260 A | 1/1999 |
| JP | 11243547 A | 9/1999 |
| JP | 11316843 A | 11/1999 |
| JP | 2000032474 A | 1/2000 |
| JP | 2000059774 A | 2/2000 |
| JP | 2000209553 A | 7/2000 |
| JP | 2000350217 A | 12/2000 |
| JP | 2001045494 A | 2/2001 |
| JP | 2001169251 A | 6/2001 |
| JP | 3189292 B2 | 7/2001 |
| JP | 2001204026 A | 7/2001 |
| JP | 2001251629 A | 9/2001 |
| JP | 2002010259 A | 1/2002 |
| JP | 2002051336 A | 2/2002 |
| JP | 2002077833 A | 3/2002 |
| JP | 2002125227 A | 4/2002 |
| JP | 2002252834 A | 9/2002 |
| JP | 2002543714 T | 12/2002 |
| JP | 2003037844 A | 2/2003 |
| JP | 2003110474 A | 4/2003 |
| JP | 2003111079 A | 4/2003 |
| JP | 2003209837 A | 7/2003 |
| JP | 2003209848 A | 7/2003 |
| JP | 2003224847 A | 8/2003 |
| JP | 2003319341 A | 11/2003 |
| JP | 2003348583 A | 12/2003 |
| JP | 2004023288 A | 1/2004 |
| JP | 2004140488 A | 5/2004 |
| JP | 2005123732 A | 5/2005 |
| JP | 2006074684 A | 3/2006 |
| JP | 2007520126 T | 7/2007 |
| JP | 2008500935 A | 1/2008 |
| KR | 1020010099660 | 11/2001 |
| KR | 20020010171 A | 2/2002 |
| KR | 20020070199 A | 9/2002 |
| KR | 20030029507 A | 4/2003 |
| KR | 100389893 B1 | 6/2003 |
| KR | 20030073254 A | 9/2003 |
| KR | 1020040046320 | 6/2004 |
| KR | 20050089721 A | 9/2005 |
| KR | 20060011281 A | 2/2006 |
| TW | 536918 B | 6/2003 |
| WO | WO9535628 A1 | 12/1995 |
| WO | WO9739577 | 10/1997 |
| WO | 9932993 A1 | 7/1999 |
| WO | WO9943157 | 8/1999 |
| WO | WO0019726 A1 | 4/2000 |
| WO | WO0067486 A1 | 11/2000 |
| WO | WO0156298 | 8/2001 |
| WO | 0166936 A1 | 9/2001 |
| WO | WO0169936 | 9/2001 |
| WO | 0178389 A1 | 10/2001 |
| WO | WO0178398 A1 | 10/2001 |
| WO | WO0225925 | 3/2002 |
| WO | WO0243398 | 5/2002 |
| WO | WO02087255 | 10/2002 |
| WO | 03052695 A2 | 6/2003 |
| WO | WO2004008747 A2 | 1/2004 |
| WO | WO2004008757 A1 | 1/2004 |
| WO | WO2004019273 | 3/2004 |
| WO | WO2004049722 A1 | 6/2004 |
| WO | WO2004054270 | 6/2004 |
| WO | WO2004057460 A2 | 7/2004 |
| WO | WO2004070953 A2 | 8/2004 |
| WO | WO2004114667 A1 | 12/2004 |
| WO | WO2004114672 | 12/2004 |
| WO | WO2005006764 A1 | 1/2005 |
| WO | WO05069917 | 8/2005 |
| WO | WO2005074147 A1 | 8/2005 |
| WO | WO2005081482 A1 | 9/2005 |
| WO | WO05107266 | 11/2005 |

(56) References Cited

FOREIGN PATENT DOCUMENTS

| WO | WO05109900 | 11/2005 |
|---|---|---|
| WO | 2006099082 A2 | 9/2006 |
| WO | WO2006099242 | 9/2006 |
| WO | WO2007047755 A1 | 4/2007 |

OTHER PUBLICATIONS

Written Opinion—PCT/US2006/023210, International Search Authority—US Patent Office—Feb. 26, 2007.
International Preliminary Report on Patentability—PCT/US2006/023210, International Bureau of WIPO, Geneva, Switzerland—Dec. 24, 2007.
MPEG Digital Video-Coding Standards, IEEE Signal Processing Magazine, IEEE Service Center, Piscataway, NJ, vol. 14, No. 5, Sep. 1997, pp. 82-100, XP011089789.
R4-030797, An Advanced Receiver Proposal for MIMO, TSG-RAN WG4 #28, Lucent Technologies, Sophia-Antipolis, Aug. 18-22, 2003, pp. 1-8.
SMPTE RP 273-1989 SMPTE Recommended Practice Specifications for Safe Action and Safe Title Areas Test Pattern for Television Systems Society of Motion Picture and Television Engineers, pp. 1-3 Approved Mar. 29, 1989.
Donoho D. L., et al., "Ideal spatial adaptation by wavelet shrinkage," Biometrika, 1994, 8, 1-30.
Ghael S.P., et al., "Improved Wavelet denoising via empirical Wiener filtering," Proceedings of SPIE, 1997, 3169, 1-11.
Girod, et al., "Scalable codec architectures for Internet video-on-demand, Signals, Systems & Computers, CA, USA Nov. 2-5, 1997, Los Alamitos, CA, USA, IEEE Comput Soc US vo," Conference Record of the Thirty-First Asilomar Conference on Pacific Grove, 1997.
Haan G. D., et al., "De-interlacing of video data," IEEE Transactions on Consumer Electronics, 1997, 43 (3), 1-7.
Haavisto P., et al., "Scan rate up-conversions using adaptive weighted median filtering" Signal Processing of HDTV II, 1990, Elsevier Science Publishers, 703-710.
Huang C., et al., "A Robust Scene-Change Detection method for Video Segmentation," IEEE Transactions on Circuits and Systems for Video Technology, 2001, 11 (12), 1281- 1288.
Jung K., et al., "Deinterlacing using Edge based Motion Estimation," IEEE MWSCS 1995, 892-895.
Kwon, et al., "Overview of H264/MPEG-4 part 10, Inc, XP005312621," Journal of visual Communication and Image Representation, 2006, 17 (2), Academic Press, 186-216.
Lee J, "A fast frame type selection technique for very low bit rate coding using MPEG-1," Real-Time Imaging, 1999, 5(2), Academic Press Limited, 83-94.
Lee S., et al., "Fast Scene Change Detection using Direct Feature Extraction from MPEG Compressed Videos," IEEE Transactions on Multimedia, 2000, 2 (4), 240-254.

Lelescu D., et al., "Statistical Sequential Analysis for Real-Time Video Scene Change Detection on Compressed Multimedia Bitstream," IEEE Transactions on Multimedia, 2003, 5 (1), 106-117.
Liang Y., et al., "A new content-based hybrid video transcoding method, Oct. 7-10, 2001," 2001 International Conference on Image Processing, 2001, 4, 429-432.
Mihaela Van Der Schaar, et al., "A Hybrid Temporal-SNR Fine-Granular Scalability for Internet Video, IEEE Service Center, XP011014178," IEEE Transactions on Circuits and Systems for Video Technology, 2001, 11 (3).
Pei S., et al., "Effective Wipe Detection in MPEG Compressed Video Using Macroblock Type Information," IEEE Transactions on Multimedia, 2002, 4 (3), 309-319.
Rusert, et al., "Enhanced interference wavelet video coding considering the interrelation of spatio-temporal transform and motion compensation, Aug. 2004, XP00004524456," Signal Processing. Image Communication, 2004, 19 (7), Elsevier Science Publishers, 617-635.
Simonetti R., et al., "Deinterlacing of HDTV Images for Multimedia Applications" Signal Processing of HDTV IV, 1993, Elsevier Science Publishers, 765-772.
Wang F. M., et al., "Time recursive Deinterlacing for IDTV and Pyramid Coding, Signal Processing," Image Communications 2, 1990, 1306-1309.
Puri et al., "Video coding using the H.264/MPEG-4 AVC compression standard" Signal Processing. Image Communication, Elsevier Science Publishers, Amsterdam, NL, vol. 19, No. 9, Oct. 1, 2004, pp. 793-849, X004607150.
De Haan Gerard, et al., "Deinterlacing—An Overview," Proceeding of the IEEE, 1998, 86 (9), 1839-1857.
Weigand et al., "Draft ITU-R recommendation and final draft international standard of Joint Video Specification" Joint Viseo Team (JVT) of ISO/IEC MPEG & ITU-T VCEG. 8th Meeting: Geneva, Switzerland. May 27, 2003.
Boyce, Jill M.: "Packet loss resilient transmission of MPEG video over the Internat" Signal Processing: Image Comminication, Elsevier Publishers, Amsterdam, NL, vol. 15, No. 1-2, Sep. 1999, pp.7-24, XP004180635.
Translation of Office Action in Chinese application 200780010753.9 corresponding to U.S. Appl. No. 11/557,778.
Translation of Office Action in Japan application 2008-533639 corresponding to U.S. Appl. No. 11/528,307.
Translation of Office Action dated Jan. 28, 2011 in Taiwanese application 096110382.
Supplementary European Search Report—EP06773184—Search Authority—Munich—Jun. 28, 2012.
"Third Generation Partnership Project 2", May 17, 2004, Qualcomm.
Mailaender, L., et al., "Linear MIMO equalization for CDMA downlink signals with code reuse", Wireless Communications, IEEE Transactions on, Sep. 2005, vol. 4, Issue 5, pp. 2423-2434.
European Search Report—EP08000729—Search Authority—the Hague—Jun. 15, 2010.
Taiwan Search Report—TW098143726—TIPO—Sep. 21, 2013.

* cited by examiner

OPTIMAL WEIGHTS FOR MMSE SPACE-TIME EQUALIZER OF MULTICODE CDMA SYSTEM

CLAIM OF PRIORITY UNDER 35 U.S.C. §119

The present Application for patent claims priority to Provisional Application No. 60/643,814, titled "Optimal Weights for MMSE Space-Time Equalizer of Multicode CDMA System", filed Jan. 14, 2005, and Provisional Application No. 60/658,265, titled "Linear MMSE Space-Time Equalizer for MIMO Multi-Code CDMA Systems", filed Mar. 2, 2005, and assigned to the assignee hereof expressly incorporated by reference herein.

BACKGROUND

1. Field

The present invention relates generally to CDMA communication systems, and more specifically to a linear MMSE space-time equalizer for MIMO multi-code CDMA systems.

2. Background

In wireless communication systems, several users share a channel within a common spectrum. To avoid conflicts arising from several users transmitting information over the communication channel at the same time, some regulation on allocating the available channel capacity to the users is required. Regulation of user access to the communication channel is achieved by various forms of multiple access protocols. One form of protocol is known as code division multiple access (CDMA). In addition to providing multiple access allocation to a channel of limited capacity, a protocol can serve other functions. For example, a protocol can provide isolation of users from each other, limit interference between users, and provide security by making interception and decoding difficult for a non-intended receiver, also referred to as low probability of intercept.

In CDMA systems, each signal is separated from those of other users by coding the signal. The information signal is uniquely encoded into a transmission signal. The intended receiver, knowing the code sequences of the user, can decode the transmission signal to receive the information. The information signal spectrum is spread by a code so that the bandwidth of the encoded transmission signal is much greater than the original bandwidth of the information signal. For this reason, CDMA is a form of "spread spectrum" coding. The energy of each user's signal is spread across the channel bandwidth so that each user's signal appears as noise to the other users. So long as the decoding process can achieve an adequate signal to noise ratio, the information in the signal can be recovered, (separation of the desired user's signal from the "noise" of the other users' signals). Other factors, which affect information recovery of the user's signal, are different conditions in the environment for each subscriber, such as fading, shadowing and multipath. Shadowing is interference caused by a physical object interrupting the signal transmission path between the transmitter and receiver, for example, a large building. Multipath is a signal distortion, which occurs as a result of the signal traversing multiple paths of different lengths and arriving at the receiver at different times. Multipath is also referred to as "time dispersion" of the communication channel. Signals that are received in phase reinforce each other and produce a stronger signal at the receiver, while those that are received out of phase produce a weak or fading signal. Multipath fading may also vary with time. For example, in a communication unit being carried in a moving car, the amount of multipath fading can vary rapidly.

To provide diversity against deleterious path effects and improve performance, multiple transmit and receive antennas may be used. If the transmission paths between the transmit and receive antennas are linearly independent (i.e., a transmission on one path is not formed as a linear combination of the transmissions on other paths, which is generally true to some extent, then the likelihood of correctly receiving a transmitted signal increases as the number of antennas increases. Generally, diversity increases and performance improves as the number of transmit and receive antennas increases. The use of multiple antennas at the transmitter and the receiver is used in multiple input multiple output (MIMO) systems.

If multiple antennas are available at the transmitter or the receiver, the peak throughput can be increased using techniques, such as spatial multiplexing and code-reuse. With code re-use, each channel allocated for transmission can modulate up to M distinct data streams, where M is the number of transmit antennas. Data streams, which share the same code, are distinguished based on their spatial characteristics, requiring a receiver with at least M antennas. In principle, the peak throughput with code re-use is M times the rate achievable with a single antenna.

In MIMO multi-code CDMA systems, reuse of the same spreading codes in different transmit antennas degrades the equalization performance if the space-time equalizer uses a minimum mean squared error (MMSE) weighting vector that minimizes the mean squared error of the equalizer output chip sequence. The CDMA despreader distorts inter-stream interference components differently from multipath interference and background noise components. This degrades performance of prior art MIMO systems.

There is therefore a need in the art for an enhanced chip-level linear space-time equalizer for multiple-input-multiple-output (MIMO) multi-code CDMA systems that can reuse spreading codes in different transmit antennas.

SUMMARY

In one aspect, a CDMA receiver comprises a space-time equalizer operably connected to receive antennas, where the space-time equalizer applies a weighting vector comprising coefficients that are a function of a spreading factor.

In another aspect, CDMA receiver comprises a space-time equalizer having coefficients of equalization, and a despreader, where the coefficients of equalization are, at least in part, a function of a spreading factor.

In yet another aspect, a method comprises receiving a plurality of signals via a plurality of receive antennas, where the received signal from each receive antenna comprises a combination of one or more signals transmitted from a transmitter unit, and processing the signal with a weighting vector having coefficients to generate a plurality of bit streams, where the coefficients are at least in part a function of spreading code reuse.

In a further aspect, CDMA receiver comprises means for equalizing operably connected to receive antennas, where the means for equalizing applies a weighting vector comprising coefficients that are a function of a spreading factor, and means for despreading operably connected to the means for equalizing, where the means for despreading separates equalized metric sequences into a plurality of modulation symbol sequences.

DETAILED DESCRIPTION

The word "exemplary" is used herein to mean "serving as an example, instance, or illustration." Any embodiment described herein as "exemplary" is not necessarily to be construed as preferred, or advantageous over other embodiments.

Figure 1A:
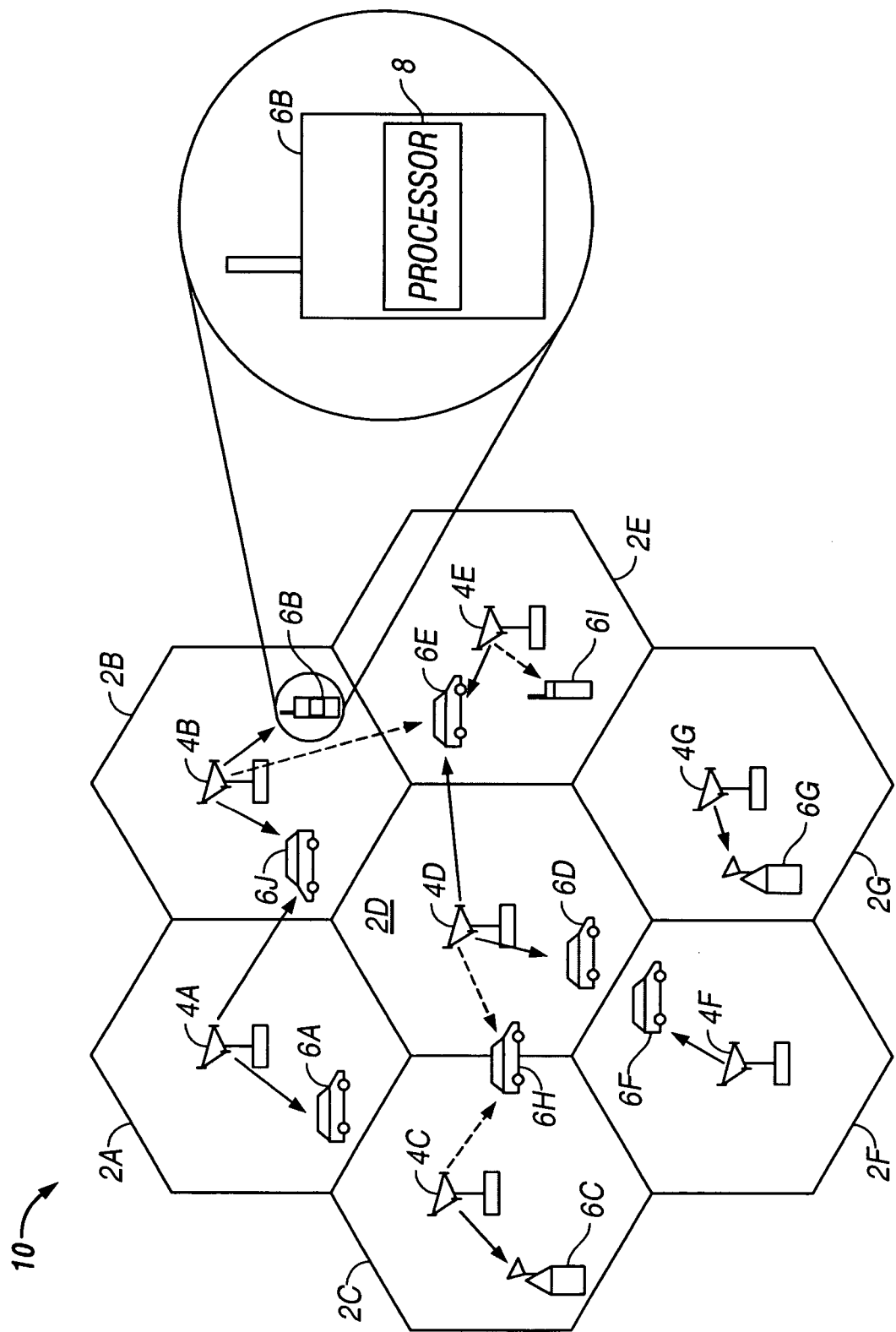
FIG. 1A is a diagram of a communications system that supports a number of users and is capable of implementing at least some aspects and embodiments of the invention.

FIG. 1A is a diagram of a communications system 10 that supports a number of users and is capable of implementing at least some aspects and embodiments of the invention. System 10 provides communication for a number of cells 2a through 2g, each of which is serviced by a corresponding base station 4. The cells are organized in a manner to achieve coverage over a desired area. The coverage area may be defined, for example, as the area over which users at terminals 6 can achieve a particular grade of service (GOS). Terminals 6 in the coverage area may be fixed or mobile, and are generally served by a primary base station. For each active terminal, transmissions from other base stations and terminals represent potential interference.

As shown in FIG. 1A, various terminals 6 are dispersed throughout the system. The terminals 6 comprise a processing device 8. Examples of processing devices 8 include, but are not limited to, processors, program logic, or other substrate configurations representing data and instructions. In other embodiments, the processors can comprise controller circuitry, processor circuitry, processors, general-purpose single-chip or multi-chip microprocessors, digital signal processors, embedded microprocessors, microcontrollers and the like.

Each terminal 6 communicates with at least one and possibly more base stations 4 on the downlink and uplink at any given moment depending on, for example, whether "soft handoff" is employed or whether the terminal is designed and operated to concurrently or sequentially receive multiple transmissions from multiple base stations. The downlink refers to transmission from the base station to the terminal, and the uplink refers to transmission from the terminal to the base station.

In FIG. 1A, base station 4a transmits data to terminals 6a and 6j on the downlink, base station 4b transmits data to terminals 6b and 6j, base station 4c transmits data to terminal 6c, and so on. In FIG. 1A, the solid line with the arrow indicates a data transmission from the base station to the terminal. A broken line with the arrow indicates that the terminal is receiving a pilot signal, but no data transmission, from the base station. The uplink communication is not shown in FIG. 1A for simplicity.

System 10 may be designed based on the communications system disclosed in U.S. patent application Ser. No. 09/532, 492, titled "HIGH EFFICIENCY, HIGH PERFORMANCE COMMUNICATIONS SYSTEM EMPLOYING MULTI-CARRIER MODULATION," filed Mar. 22, 2000, or the system disclosed in U.S. patent application Ser. No. 08/963,386, titled "METHOD AND APPARATUS FOR HIGH RATE PACKET DATA TRANSMISSION," both of which are assigned to the assignee of the present invention and incorporated herein by reference. System 10 may also be designed as a CDMA system that supports one or more CDMA standards, such as the IS-95 standard, the W-CDMA standard, other standards, or a combination thereof.

In system 10, a number of terminals share a common resource, namely the total operating bandwidth, W. To achieve a desired level of performance at a particular terminal, the interference from other transmissions need to be reduced to an acceptable level. Also, to reliably transmit at high data rates for a given operating bandwidth, it is necessary to operate at or above a particular carrier-to-noise-plus-interference (C/I) level. Reduction in interference and attainment of the required C/I are conventionally achieved by dividing the total available resource into fractions, each of which is assigned to a particular cell.

For example, the total operating bandwidth W can be divided into N equal operating frequency bands (i.e., B=W/N) and each cell can be assigned to one of the N frequency bands. The frequency bands are periodically reused to achieve higher spectral efficiency. For a 7-cell reuse pattern such as that supported by FIG. 1A, cell 2a may be assigned the first frequency band, cell 2b may be assigned the second frequency band, and so on.

A communications system is typically designed to conform to a number of system requirements that may include, for example, quality of service (QOS), coverage, and performance requirements. Quality of service is typically defined as every terminal in the coverage area being capable of achieving a specified minimum average bit rate a prescribed percentage of the time.

Recent advances of multiple-input-multiple-output (MIMO) transmission technology promise a huge throughput gain in the future wireless communication systems by using multiple antennas in both the transmitter and the receiver. The MIMO technology can be incorporated into various modulation and multiple access schemes such as, for example, MIMO-CDMA, MIMO-OFDM, and the like.

The high-speed packet data channels in the 3G CDMA standards such as High Speed Downlink Shared Channel (HS-DSCH) and Forward-link Packet Data Channel (F-PDCH), and the like, typically use multiple channelization codes, such as Walsh codes, with a fixed spreading factor (SF) to transmit and receive a large volume of information data in a short frame interval. Depending on the data rate of the current packet, the base station (BS) can select a number of codes out of the available channelization codes in order to accommodate the corresponding number of modulation symbols. As the MIMO-CDMA system supports multiple transmit streams through multiple transmit antennas, the corresponding BS often reuses the same channelization codes for different antennas. Unless designed in the MIMO-CDMA context, code-reuse among the transmit antennas may bring about a critical impairment in the mobile station (MS) space-time equalizer.

System Model of MIMO Multi-Code CDMA

Figure 1B:
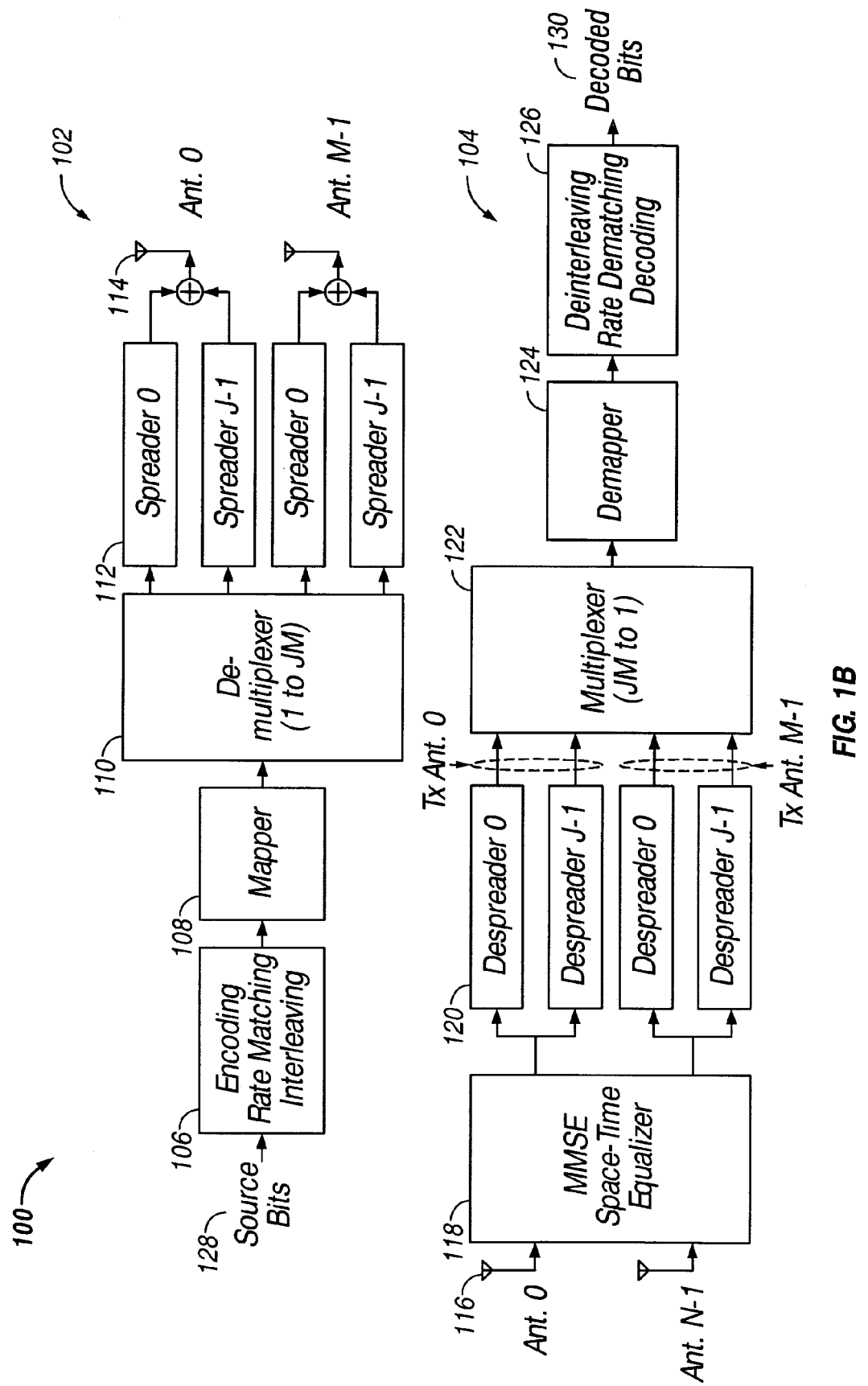
FIG. 1B is a block diagram of an embodiment of a MIMO multi-code CDMA system.

FIG. 1B is a block diagram of an embodiment of a MIMO multi-code CDMA system 100 including a transmitter portion 102 and a receiver portion 104. The spreading factor is denoted as SF in the following discussion. The transmitter portion 102 includes an encoder 106, a mapper 108, a demultiplexer 110, a plurality of spreaders 112, and a plurality of transmit antennas 114. The number of transmit antennas 114 is M and the number of orthogonal spreading codes allocated to each transmit antenna 114 is J(J≤SF).

The receiver portion 104 includes a plurality of receive antennas 116, a minimum mean squared error (MMSE) space-time equalizer 118, a plurality of despreaders 120, a multiplexer 122, a demapper 124, and a decoder 126. The number of receive antennas 116 is N and the number of despreaders 120 allocated to each receive antenna 116 is $J(J \leq SF)$, which corresponds to the number of spreaders 112 allocated to each transmit antenna 114. It is understood to one of ordinary skill in the art that the space-time equalizer 118 discussed herein can be applied to general MIMO-CDMA systems.

The terms encoder, decoder, rate matcher, interleaver, deinterleaver, mapper, demapper, spreader, despreader and space-time equalizer are broad terms intended to have their ordinary meanings. In addition, an encoder can be a device or method that is used to encode a signal (such as a bitstream) or data from one form into another, such as into a form suitable for transmission, storage, or processing. Encoders can generally be implemented in software or hardware, for example, by a program. algorithm, method or in circuitry. A decoder be a device that does the reverse of an encoder, undoing the encoding so that the original information can be retrieved.

A rate matcher can be a device or method that adjusts the rate of a data stream or bit rate to a desired rate. For example, in a transmitter the rate matcher can adjust the bit rate to match the capability of the transmitter. In a receiver, the rate matcher can do the inverse process.

An interleaver can be a device or method that arranges data in a noncontiguous way in order to increase performance. A deinterleaver can generally do the reverse of an interleaver, and arrange interleaved data in a contiguous way so that it may be more easily processed.

A mapper can be a device or method that collects a group of bits and transforms them into a single modulation symbol. A demapper can be a device or method that generally does the reverse of a mapper, such as, for example, transforming a single modulation symbol into a group of bits.

A spreader can be a device or method that increases the bandwidth of a transmitted signal by a factor in excess of its information signal bandwidth. A despreader can be a device or method that generally does the reverse of a spreader and decreases the bandwidth of a received signal. For example, a despreader can decrease the bandwidth of a received signal to its information bandwidth.

A space-time equalizer can be a device or method that provides space and time scaling and combining to a signal. For example, a space-time equalizer can scale and combine a received signal spatially and temporally to restore the original signal.

Referring to FIG. 1B, the encoder 106 receives a source bit sequence 128. The source bit sequence 128 in each frame is encoded, rate-matched (i.e., punctured or repeated), and interleaved in the encoder 106, and mapped to the modulation symbol sequence (e.g., QPSK, 16QAM, etc.) in the mapper 108. Then the modulation symbol sequence is demultiplexed in the demultiplexer 110 to M groups of J streams, where the m-th group is transmitted through the m-th transmit antenna 114. The J streams in each group are spread by J spreading codes in the spreaders 112, where the j-th spreading code is equivalent to the product of the j-th channelization code, such as an orthogonal code, a quasi-orthogonal code, or a Walsh code, for example, of spreading factor SF and the pseudorandom scrambling code of the BS. Each group typically reuses the same set of J spreading codes and each transmit antenna 114 typically uses the same transmit power, but the invention is not limited to these specific cases.

After going through a multi-dimensional multipath fading channel, the transmitted signals arrive at the N receive antennas 116, where the MMSE space-time chip equalizer 118 separates the received signals into M groups of equalized soft metric sequences corresponding to the M transmit antennas 114. Then, in the despreaders 120, the J despreading codes, which are equivalent to the conjugates of the J spreading codes, separate the equalized soft metric sequence of each group into J soft demodulation symbol sequences, each of which corresponds to each orthogonal Walsh channel in the group. The resulting J×M demodulation symbol sequences are multiplexed in the multiplexer 122 to a single stream and demapped in the demapper 124 to a sequence, such as, for example, a log-likelihood ratio (LLR) sequence. The sequence is deinterleaved, inversely rate-matched, and decoded in the decoder 126 to restore the original source bit sequence as decoded bits 130.

Figure 2A:
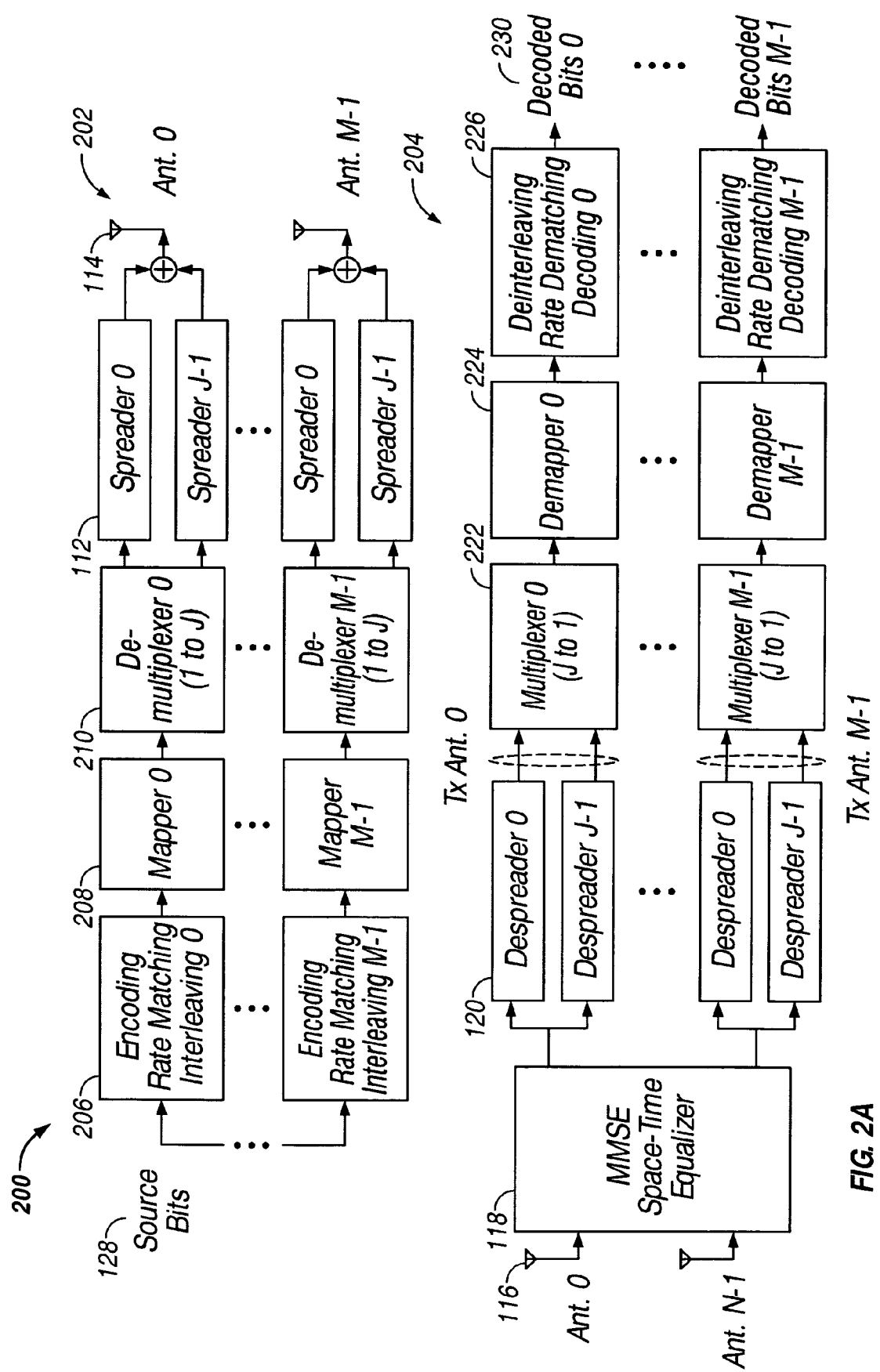
FIG. 2A is a block diagram of another embodiment of a MIMO multi-code CDMA system.

FIG. 2A is a block diagram of an embodiment of a MIMO multi-code CDMA system 200 including a transmitter portion 202 and a receiver portion 204. The spreading factor is denoted as SF in the following discussion.

The transmitter portion 202 includes a plurality of encoders 206, a plurality of mappers 208, a plurality of demultiplexers 210, a plurality of spreaders 112, and a plurality of transmit antennas 114. The number of transmit antennas 114 is M and the number of spreading codes allocated to each transmit antenna 114 is $J(J \leq SF)$.

The receiver portion 204 includes a plurality of receive antennas 116, a minimum mean squared error (MMSE) space-time equalizer 118, a plurality of despreaders 120, a plurality of multiplexers 222, a plurality of demappers 224, and a plurality of decoders 226. The number of receive antennas 116 is N and the number of despreaders 120 allocated to each receive antenna 116 is $J(J \leq SF)$, which corresponds to the number of spreaders 112 allocated to each transmit antenna 114.

Each encoder 206 receives a source bit sequence 128 for the encoder 206. The source bit sequence 128 in each frame is encoded, rate-matched (i.e., punctured or repeated), and interleaved in its corresponding encoder 206, and mapped to the modulation symbol sequence (e.g., QPSK, 16QAM, etc.) in its corresponding mapper 208. Then the modulation symbol sequence is demultiplexed in its corresponding demultiplexer 210 to a group of J streams, where the m-th group is transmitted through the m-th transmit antenna 114. The J streams in each group are spread by J spreading codes in the spreaders 112, where the j-th spreading code is equivalent to the product of the j-th channelization code, such as an orthogonal code, a quasi-orthogonal code, or a Walsh code, for example, of spreading factor SF and the pseudorandom scrambling code of the BS. Each group typically reuses the same set of J spreading codes and each transmit antenna 114 typically uses the same transmit power, but the invention is not limited to these specific cases.

After going through a multi-dimensional multipath fading channel, the transmitted signals arrive at the N receive antennas 116, where the MMSE space-time chip equalizer 118 separates the received signals into M groups of equalized soft metric sequences corresponding to the M transmit antennas 114. Then, in the despreaders 120, the J despreading codes, which are equivalent to the conjugates of the J spreading codes, separate the equalized soft metric sequence of each group into J soft demodulation symbol sequences, each of which corresponds to each orthogonal Walsh channel in the group. Each of the M resulting J demodulation symbol sequences is multiplexed in its corresponding multiplexer 222 to a single stream and demapped in its corresponding demapper 224 to a sequence, such as, for example, a log-likelihood ratio (LLR) sequence. Each of the M sequences is deinterleaved, inversely rate-matched, and decoded in its corresponding decoder 226 to restore the original source bit sequence as decoded bits 230.

In one embodiment, the soft metric sequence of the MIMO CDMA system 100, 200 after MMSE space-time equalization includes five components: desired signal, one or more on-time inter-stream interferences (or, cross-talks among distinct transmit antenna signals) which reuse the same spreading code as the desired signal; one or more on-time inter-stream interferences which do not reuse the same spreading code as the desired signal; one or more multi-path interferences (i.e., total serving-cell signal components, which are not on-time); and background noise (other-cell interference, thermal noise, etc.).

The on-time inter-stream interferences are either: kept intact, if the spreading code of the desired signal is reused by the despreading process; or nullified, if the spreading code of the desired signal is not reused by the despreading process. The multi-path interferences and background noise are suppressed roughly by the factor of SF.

Figure 2B:
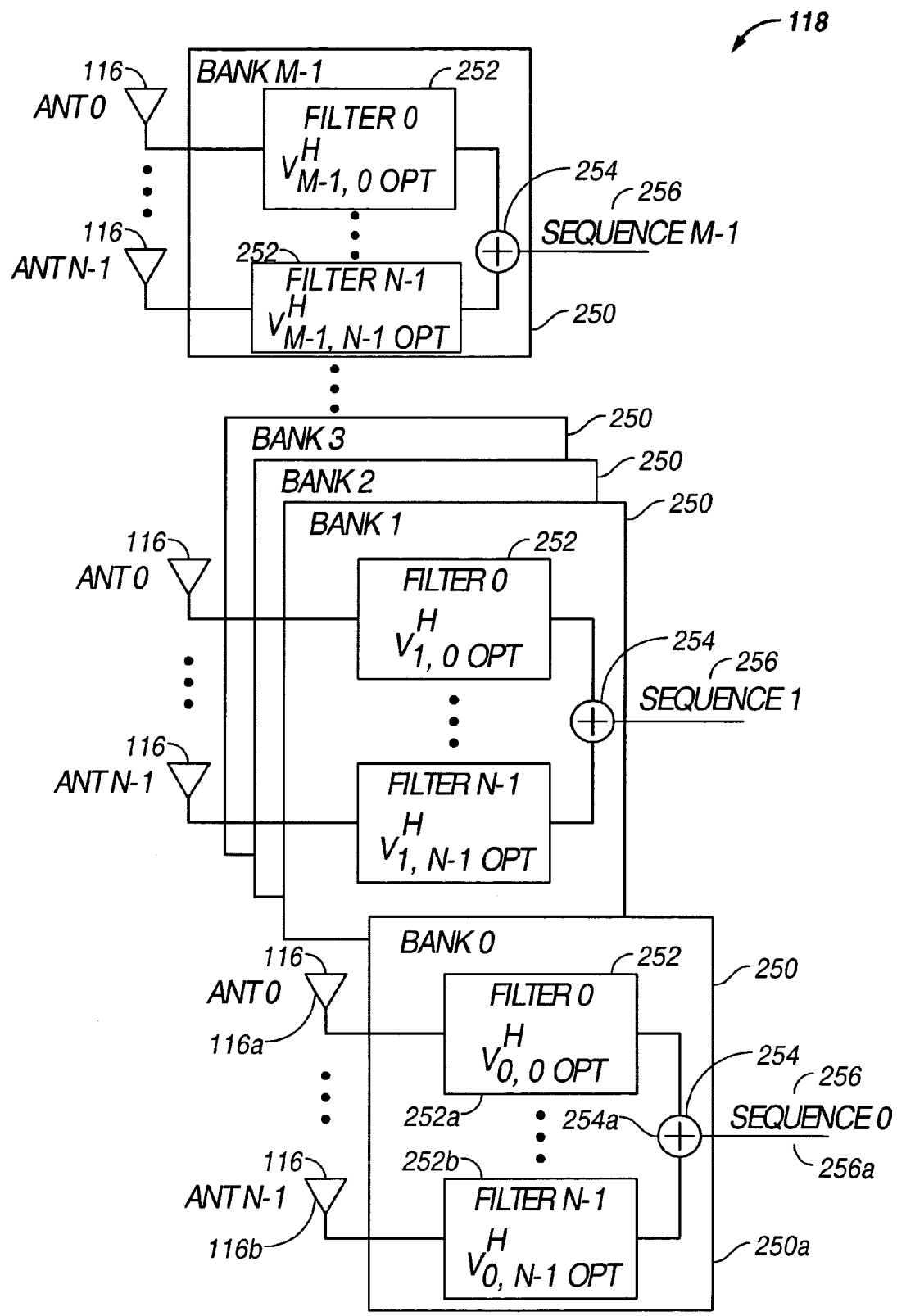
FIG. 2B is a block diagram of an embodiment of a MMSE space-time equalizer.

FIG. 2B is a block diagram of an embodiment of the space-time equalizer 118. The space-time equalizer 118 comprises M equalizing banks 250 (bank m, where m=0, 1, . . . , M−1) corresponding to the M transmit antennas 114. Each bank 250 comprises N filters 252 (filter n, where n=0, 1, N−1) corresponding to the N receive antennas 116 and an adder 254. The filters 252 have a filter coefficient $V^H_{m, n\ OPT}$, where m=0, 1, 2, . . . , M−1 and n=0, 1, 2, . . . , N−1, and each filter 252 produces a filtered output signal. Each bank 250 receives a signal from each of the N receive antennas 116, and processes the signal in the corresponding filter 252. The adder 254 sums the filtered output signals from each filter 252 in each bank 250 to generate an equalized metric sequence 256.

Focusing on the equalizing bank 0 250a, for the $j^{th}$ filter, where j=0, 1, . . . , N−1, in bank 0, having a filter coefficient $V^H_{0, j\ OPT}$, an input of the filter j connects to the $j^{th}$ receive antenna, and an output of the filter j connects to an input of the adder 254a.

For example, an input of the filter 0 252a in equalizing bank 0 250a, having the filter coefficient $V^H_{0, 0\ OPT}$, connects to the receive antenna 0 116a, and an output of the filter 0 252a connects to the input of the adder 254a. Likewise, an input of the filter N−1 252b, having a filter coefficient $V^H_{0, N-1\ OPT}$, connects to the receive antenna N−1 116b, and an output of the filter N−1 252b connects to the input of the adder 254a.

The outputs from the filter n where n=0, 1, . . . , N−1 in block 0 250a are summed in the adder 254a to generate the equalized metric sequence, Sequence 0 256a.

Similarly, the N filtered outputs of the N filters 252 in each block m 250 where m=0, 1, . . . , M−1 are summed to produce M equalized metric sequences 256.

The channel coefficients $h_j$, and the noise covariance $R_n$, as described further in equation 8, are computed from a pilot signal. The filter coefficients $V^H_{m, n\ OPT}$, where m=0, 1, 2, . . . , M−1 and n=0, 1, 2, . . . , N−1, are computed using the computed channel coefficients $h_j$, and noise covariance $R_n$.

In another embodiment, the equalizer 118 is implemented as software in the processor 8.

Figure 3:
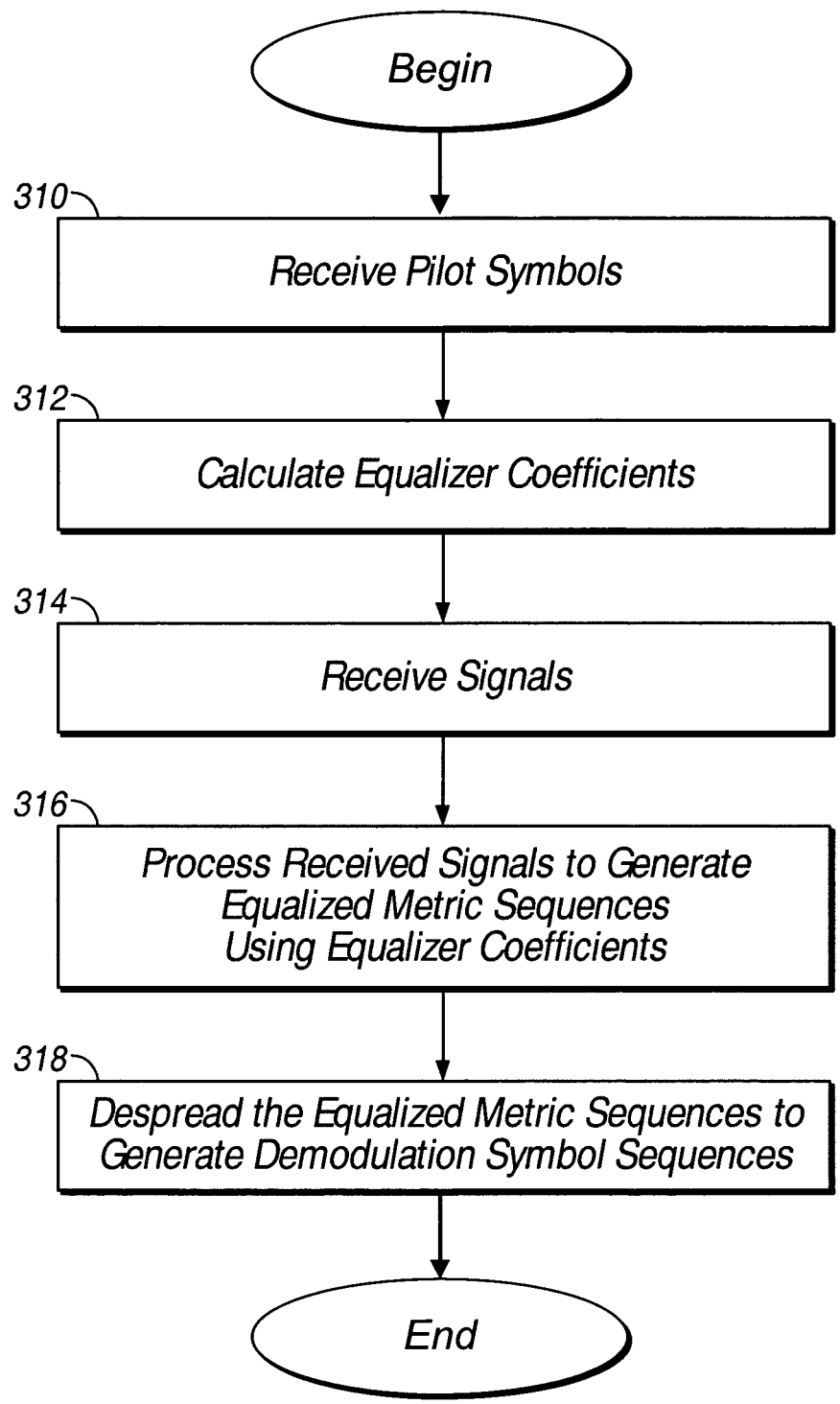
FIG. 3 is a flow chart illustrating the operation of an embodiment of a multi-code CDMA system.

FIG. 3 is a flow chart 300 illustrating the operation of an embodiment of a multi-code CDMA receiving system 104, 204. In an embodiment, the multi-code CDMA receiving system 104, 204 operates in a continuous loop starting at the Begin block and ending at the End block. In block 310, the equalizer 118 receives the pilot symbol sequence. In block 312, the equalizer 118 calculates the equalizer coefficients using the pilot symbols.

In block 314, the receive system 104, 204 receives a signal through antennas 116. In block 316, the received signal is equalized in the equalizer 118 using the equalizer coefficients. The equalizer 118 processes the received signal to generate equalized metric sequences 256.

In block 318, the equalized metric sequences 256 are processed by the despreaders 120 to generate demodulation symbol sequences.

The existence of the on-time inter-stream interference makes the traditional chip-level MMSE equalizer suboptimal, as it does not consider the despreading effect. The traditional chip-level MMSE weights are steered in the suboptimal direction of the noise space in the MIMO CDMA application, which degrades the decoding performance. Moreover, the despreading effect for the MMSE weight optimization in the SISO multi-code CDMA does not change the weights (or the steering direction) except for a different scaling factor. Assuming that the demapper 124, 224 rescales the soft demodulation symbol, the decoding performance is not affected in the SISO multi-code CDMA.

In general, as the number of spreading codes used for each stream is increased, the gap between the optimal MMSE weights (taking the despreading effect into account) and the suboptimal MMSE weights decreases, because the despreading gain of the on-time inter-stream interference will be discounted roughly by the factor of the number of used spreading codes, as discussed below.

Linear MMSE Equalizer Weights for MIMO Multi-Code CDMA

Traditional Chip-Level MMSE Weight Optimization in MIMO Multi-Code CDMA

The traditional MMSE space-time chip equalizer separates the received signal into M groups of equalized soft metric sequences corresponding to the M transmit antennas 114. The sequences are then processed by the multiplexer 122, 222, the demapper 124, 224, and the decoder 126, 226 to produce the decoded bits 130, 230, respectively.

In the following discussion of the traditional chip-level MMSE weight optimization, the span of the multipath delay spread is L chips long, the span of the equalizer is E chips long, and the receiver takes P samples per chip (i.e., the oversampling factor is P). Further $h_{n,m,p}(l)$ (l=0, 1, . . . , L−1; n=0, 1, . . . , N−1; m=0, 1, . . . , M−1; p=0, 1, . . . , P−1) is the channel coefficient between the m-th transmit antenna 114 and the n-th receive antenna 116 corresponding to the l-th chip delay and the p-th sample of the chip. The chip signal of the m-th transmit antenna 114 at chip time k is denoted by $\sigma_x x_m(k)$, where $E[|x_m(k)|^2]=1$ and $\sigma_x^2$ is the average chip energy of each transmit antenna 114.

Define $$x_m(k) \equiv \sigma_x[x_m(k) x_m(k+1) \ldots x_m(k+E+L-2)]^T \quad (1)$$

as the (E+L−1)-dimensional chip vector of the m-th transmit antenna 114 spanning from index k to k+E+L−2. Also, let $y_{n,p}(k)$ and $n_{n,p}(k)$ be the received sample and its background noise component at the n-th receive antenna 116 on the p-th sample of the k-th chip.

Further defining $$y_n(k) \equiv [y_{n,0}(k) \ldots y_{n,P-1}(k) \ldots (y_{n,0}(k+E-1) \ldots y_{n,P-1}(k+E-1)]^T \quad (2)$$

and $$n_n(k) \equiv [n_{n,0}(k) \ldots n_{n,P-1}(k) \ldots n_{n,0}(k+E-1) \ldots n_{n,P-1}(k+E-1)]^T \quad (3)$$

as the PE-dimensional received sample vector and the corresponding background noise vector at the n-th receive antenna 116, then $$\begin{bmatrix} y_0(k) \\ \vdots \\ y_{N-1}(k) \end{bmatrix} = \begin{bmatrix} H_{0,0} & \ldots & H_{0,M-1} \\ \vdots & \ddots & \vdots \\ H_{N-1,0} & \ldots & H_{N-1,M-1} \end{bmatrix} \begin{bmatrix} x_0(k) \\ \vdots \\ x_{M-1}(k) \end{bmatrix} + \begin{bmatrix} n_0(k) \\ \vdots \\ n_{N-1}(k) \end{bmatrix} \quad (4)$$

In equation 4, $H_{n,m}$ denotes the PE×(E+L−1) multipath channel matrix between the m-th transmit antenna 114 and the n-th receive antenna 116 and is given as $$H_{n,m} \equiv \begin{bmatrix} h_{n,m,0}(L-1) & \ldots & h_{n,m,0}(0) \\ \vdots & & \vdots \\ h_{n,m,P-1}(L-1) & \ldots & h_{n,m,P-1}(0) \\ & \ddots & \\ & & h_{n,m,0}(L-1) & \ldots & h_{n,m,0}(0) \\ & & \vdots & & \vdots \\ & & h_{n,m,P-1}(L-1) & \ldots & h_{n,m,P-1}(0) \end{bmatrix}. \quad (5)$$

Furthermore, define $y(k) \equiv [y_0(k)^T y_1(k)^T \ldots y_{N-1}(k)^T]^T$ as the NPE-dimensional overall received sample vector, $n(k) \equiv [n_0(k)^T n_1(k)^T \ldots n_{N-1}(k)^T]^T$ as the NPE-dimensional overall background noise vector, $R_n \equiv E[n(k)n(k)^H]$ as the NPE×NPE noise covariance matrix, and $$H \equiv [h_0 h_1 \ldots h_{M(E+L-1)-1}] \equiv \begin{bmatrix} H_{0,0} & \ldots & H_{0,M-1} \\ \vdots & \ddots & \vdots \\ H_{N-1,0} & \ldots & H_{N-1,M-1} \end{bmatrix} \quad (6)$$

as the NPE×M(E+L−1) overall multipath channel matrix. Then the optimal chip-level linear MMSE weighting vector $w_m^H$ for the m-th transmit antenna chip stream with a target delay of D chips that minimizes $E[|w_m^H y(k) - x_m(k+D)|^2]$ becomes $$w_m^H = \sigma_x^2 h_{m(E+L-1)+D}^H [\sigma_x^2 HH^H + R_n]^{-1} \quad (7)$$
$$= \sigma_x^2 h_{m(E+L-1)+D}^H \left[ \sum_{i=0}^{M(E+L-1)-1} \sigma_x^2 h_i h_i^H + R_n \right]^{-1}$$

where the channel matrix coefficients are calculated from a pilot signal as described above.

By applying the matrix inversion lemma, equation 7 can be rewritten:

$$w_m^H = \left( \frac{1}{1 + SNR_{m,chip}} \right) \times \sigma_x^2 h_{m(E+L-1)+D}^H \quad (8)$$
$$\left[ \sum_{i \neq m(E+L-1)+D, i=0}^{M(E+L-1)-1} \sigma_x^2 h_i h_i^H + R_n \right]^{-1}$$

where the equalizer output chip SNR is $$SNR_{m,chip} = \sigma_x^2 h_{m(E+L-1)+D}^H \quad (9)$$
$$\left[ \sum_{i \neq m(E+L-1)+D, i=0}^{M(E+L-1)-1} \sigma_x^2 h_i h_i^H + R_n \right]^{-1} h_{m(E+L-1)+D}$$

Moreover, the equalizer output soft chip metric becomes $$\tilde{x}_m(k+D) = w_m^H y(k) \quad (10)$$
$$= \frac{SNR_{m,chip}}{1 + SNR_{m,chip}} [x_m(k+D) + \text{noise}]$$

When the j-th spreading code (or, the product of the j-th Walsh code and the common scrambling code) is denoted by $C_j(k)$ (where $|C_j(k)|^2=1$), the output soft symbol of the despreader 120 (with spreading factor being SF) becomes $$z_m^j(n) = \frac{1}{\sqrt{SF}} \sum_{k=0}^{SF-1} \tilde{x}_m(n \cdot SF + k) C_j^*(k), \quad (11)$$
$$j = 0, 1, 2, \ldots, J-1$$

where A* denotes the complex conjugate of A. The demapper 124 rescales and converts the output soft symbol to the bit values for the symbol index n, the code index j, and the transmit antenna index m.

The MMSE weighting vector of equation (7) is not optimal in the perspective of the decoder 126, 226 because it was optimized without consideration of the outstanding behavior of the on-time inter-stream interferences in the despreader 120.

Enhanced Chip-Level MMSE Weighting Vector for MIMO Multi-Code CDMA

A MIMO multi-code CDMA system that equalizes the received signals before despreading is discussed below. The space-time equalizer applies a weighting vector having coefficients that are a function of the spreading factor.

Considering that the transmit chip value $x_m(k)$ is composed of J orthogonal channel components, i.e., $$x_m(k) = \frac{1}{\sqrt{J}} \sum_{j=0}^{J-1} x_m^j(k) \quad (12)$$

where $x_m^j(k)$ is the chip subcomponent corresponding to the jth spreading code of the m-th transmit antenna 114 (where $E[|x_m^j(k)|^2]=1$), the SNR of the despreader output symbol metric $z_m^j(n)$ in equation (11) may be $$SNR_{m,symbol}^j = \frac{SF}{J} \sigma_x^2 h_{m(E+L-1)+D}^H \quad (13)$$
$$\left[ \sum_{i \neq m(E+L-1)+D, i=0}^{M(E+L-1)-1} \sigma_x^2 h_i h_i^H + R_n \right]^{-1} h_{m(E+L-1)+D}$$

Note that the orthogonal despreading is supposed to introduce the gain factor of SF and the loss factor of J with respect to the chip SNR.

However, the actual SNR of the despreader output symbol becomes lower than equation (13) in the code-reused MIMO multi-code CDMA system 100 because the on-time inter-stream interferences behave differently from the multipath interference or the background noise in the despreading process. Furthermore, the MMSE weighting vector of equation (7) is not optimal in the perspective of the decoder 126, 226 because it was optimized without consideration of the outstanding behavior of the on-time inter-stream interferences in the despreader 120. Thus, the SNR of equation (13) is difficult to achieve in practice, as discussed further below.

Referring to equations (4)-(6) and equations (10)-(12), the soft demodulation symbol equalized by a weighting vector $v_m^H$ (for the m-th transmit antenna stream) and despread by the j-th despreading code $C_j^*(k)$ can be written:

$$z_m^j(n) = v_m^H \left[ \sqrt{\frac{SF}{J}} \sigma_x d_{m(E+L-1)+D}^j(n) h_{m(E+L-1)+D} \right] + \quad (14)$$

$$v_m^H \left[ \sum_{\substack{p \neq m, p=0}}^{M-1} \sqrt{\frac{SF}{J}} \sigma_x d_{p(E+L-1)+D}^j(n) h_{p(E+L-1)+D} + \right.$$

-continued $$\left. \sum_{\substack{q \neq p(E+L-1)+D \\ p=0,1,\ldots,M-1}} \sigma_x d_q^j(n) h_q + n_d^j(n) \right]$$

where the first and the second terms respectively represent the signal and the interference components. More specifically, $d_{m(E+L-1)+D}^j(n)$, $d_{p(E+L-1)+D}^j(n)$, and $d_q^j(n)$ in equation (14) represent the desired symbol component, the on-time inter-stream interference components using the j-th spreading code, and the multipath interference component, respectively, after dispreading. The on-time inter-stream interference components that do not use the j-th spreading code disappear during the despreading process. Conversely, the on-time inter-stream interference components using the j-th spreading code have the spreading gain of SF due to the despreading, as does the desired signal component. The covariances of the multipath interference component and the background noise component (denoted by $n_d^j(n)$ in equation (14)) are not changed by the despreading operation.

In the perspective of the decoder 126, 226, the optimal MMSE weighting vector $v_{m,opt}^H$ should minimize $E[|z_{m,opt}^j(n) - d_{m(E+L-1)+D}^j(n)|^2]$ (that is, the minimization should be made with respect to the target symbol) and thus it becomes $$v_{m,opt}^H = \sqrt{\frac{SF}{J}} \sigma_x h_{m(E+L-1)+D}^H \quad (15)$$

$$\left[ \sum_{p=0}^{M-1} \frac{SF}{J} \sigma_x^2 h_{p(E+L-1)+D} h_{p(E+L-1)+D}^H + \sum_{\substack{q \neq p(E+L-1)+D \\ p=0,1,\ldots,M-1}} \sigma_x^2 h_q h_q^H + R_n \right]^{-1}$$

By applying the matrix inversion lemma, the spreading-factor dependent MMSE weighting vector can be rewritten as $$v_{m,opt}^H = \left( \frac{1}{1 + SNR_{m,symbol}^{j,opt}} \right) \times \sqrt{\frac{SF}{J}} \sigma_x \quad (16)$$

$$h_{m(E+L-1)+D}^H \left[ \sum_{\substack{p \neq m, p=0}}^{M-1} \frac{SF}{J} \sigma_x^2 h_{p(E+L-1)+D} h_{p(E+L-1)+D}^H + \sum_{\substack{q \neq p(E+L-1)+D \\ p=0,1,\ldots,M-1}} \sigma_x^2 h_q h_q^H + R_n \right]^{-1}$$

The despreader output symbol SNR of the j-th code of the m-th transmit antenna 114 becomes $$SNR_{m,symbol}^{j,opt} = \frac{SF}{J} \sigma_x^2 \quad (17)$$

$$h_{m(E+L-1)+D}^H \left[ \sum_{\substack{p \neq m, p=0}}^{M-1} \frac{SF}{J} \sigma_x^2 h_{p(E+L-1)+D} h_{p(E+L-1)+D}^H + \sum_{\substack{q \neq p(E+L-1)+D \\ p=0,1,\ldots,M-1}} \sigma_x^2 h_q h_q^H + R_n \right]^{-1}$$

$$h_{m(E+L-1)+D}$$

Equations (13) and (17) shows the variance of the on-time interference components of equation (17) is greater than that of equation (13) by the factor of SF/J. Therefore, the achievable SNR in equation (17) is lower than the expected SNR of equation (13) unless separate SF codes are allocated to the data transmission and the transmit antennas 114 fully reuse them (i.e., J=SF). In practice, the number of allocated and reused codes is often smaller than the SF due to the data rate dependent allocation of the spreading codes (e.g., a smaller number of codes for lower data rate and a larger number of codes for higher data rate), existence of control channels, voice channels, etc. Equations (8) and (16) show the traditional chip-level optimized MMSE weighting vector is not optimal in the soft symbol level to be used by the demapper 124, 224 and the decoder 126, 226 due to the discrepancy of the power factor SF/J of the on-time inter-stream interference components. The traditional chip-level MMSE weighting vector underestimates the on-time inter-stream interference components as it does not take the effect of despreading into account, and thus steers in a suboptimal direction. As a result, in one embodiment, using the weighting vector of equation (8), the actual symbol SNR becomes even lower than equation (17), which is far from the upper bound of equation (13). The performance gap between the MIMO-CDMA optimized MMSE weighting vector in equation (16) and the traditional weighting vector in equation (8) becomes greater as we decrease the number of spreading codes reused by the multiple antennas is decreased.

In deriving the enhanced chip-level equalizer 118, the system models of FIGS. 1 and 2 are used, where the multiple antennas 114 reuse the same spreading codes and all antennas 114 and codes use approximately the same amount of transmit power.

Referring to equation (8) and equation (16), the component that changes the steering direction of the weighting vector is the on-time inter-stream interference. Therefore, in the SISO multi-code CDMA system where no inter-stream interference exists, the traditional chip-level MMSE weighting vector and the enhanced MMSE weighting vector steer in the same direction (that is, they are aligned in the signal space). The scaling of the weighting vectors, however, can be different. The scaling factor is a function of SNR and if, the demapper 124, 224 can accurately rescale the input soft symbol to yield an unbiased estimate, then the traditional chip-level MMSE weighting vector and the enhanced MMSE weighting vector have approximately the same decoding performance.
Generalization of the Enhanced Equalizer to Arbitrary Power and Code Allocation Cases in MIMO Multi-Code CDMA In generating the Enhanced Chip-level MMSE Weighting Vector for the MIMO Multi-code CDMA receiver 104, 204, in equations (12)-(17), it was assumed that all the M transmit antennas 114 reuse the same J spreading codes and a total transmit chip energy of $M\sigma_x^2$ is equally divided and allocated to JM streams separated by transmit antennas 114 and spreading codes. Equivalently, each of the JM stream was assumed to have the chip energy of $\sigma_x^2/J$. In this section, arbitrary code and power allocation cases take the existence of the practical code-division multiplexed pilot, control, and voice channels and the unequal power allocation into account.

For this purpose, define $E_m^j$ as the chip energy allocated to the m-th transmit antenna 114 (m=0, 1, ..., M−1) and the j-th code of spreading factor SF (j=0, 1, ..., SF−1), which includes the sum of the chip energy allocated to all the possible sub-code trees of the j-th code if they are being used in the m-th antenna 114. If the j-th code is not used by the m-th transmit antenna 114, then $E_m^j$ is equal to 0. The result of the enhanced chip-level MMSE weighting vector for MIMO multi-code CDMA, as discussed above, is valid for the special case where $$E_m^j = \begin{cases} \sigma_x^2/J, & m = 0, 1, \ldots M-1; j = 0, 1, \ldots J-1 \\ 0, & m = 0, 1, \ldots M-1; j = J, J+1, \ldots SF-1 \end{cases} \quad (18)$$

and the transmit power is allocated to the data transmission. In one embodiment, no control or pilot channels share the transmit power with the MIMO data stream at the same time. Denoting the total transmit chip energy for the m-th transmit antenna 114, including all the channels such as data, pilot, control, and the others by $I_{or}^m$ and define $$I_{or} \equiv \sum_{m=0}^{M-1} I_{or}^m,$$

the optimal MMSE weighting vector $w_{m,j,opt}^H$ for the j-th code and the m-th transmit stream can be derived in the manner used for equation (15), which becomes $$w_{m,j,opt}^H = \sqrt{SF \cdot E_m^j} \quad (19)$$

$$h_{m(E+L-1)+D}^H \left[ \sum_{p=0}^{M-1} SF \cdot E_p^j h_{p(E+L-1)+D} h_{p(E+L-1)+D}^H + \sum_{\substack{q \neq p(E+L-1)+D \\ p=0,1,\ldots,M-1}} I_{or}^p h_q h_q^H + R_n \right]^{-1}$$

Moreover, applying the matrix inversion lemma, the equivalent weighting vector becomes $$w_{m,j,opt}^H = \left( \frac{1}{1 + SNR_{m,symbol}^{j,opt}} \right) \times \sqrt{SF \cdot E_m^j} \quad (20)$$

$$h_{m(E+L-1)+D}^H \left[ \sum_{\substack{p \neq m, p=0}}^{M-1} SF \cdot E_p^j h_{p(E+L-1)+D} h_{p(E+L-1)+D}^H + \sum_{\substack{q \neq p(E+L-1)+D \\ p=0,1,\ldots,M-1}} I_{or}^p h_q h_q^H + R_n \right]^{-1}$$

where the despreader output symbol SNR of the j-th code of the m-th transmit antenna 114 becomes $$SNR_{m,symbol}^{j,opt} = SF \cdot E_m^j \quad (21)$$

$$h_{m(E+L-1)+D}^H \left[ \sum_{\substack{p \neq m, p=0}}^{M-1} SF \cdot E_p^j h_{p(E+L-1)+D} h_{p(E+L-1)+D}^H + \sum_{\substack{q \neq p(E+L-1)+D \\ p=0,1,\ldots,M-1}} I_{or}^p h_q h_q^H + R_n \right]^{-1}$$

$$h_{m(E+L-1)+D}$$

Figure 4:
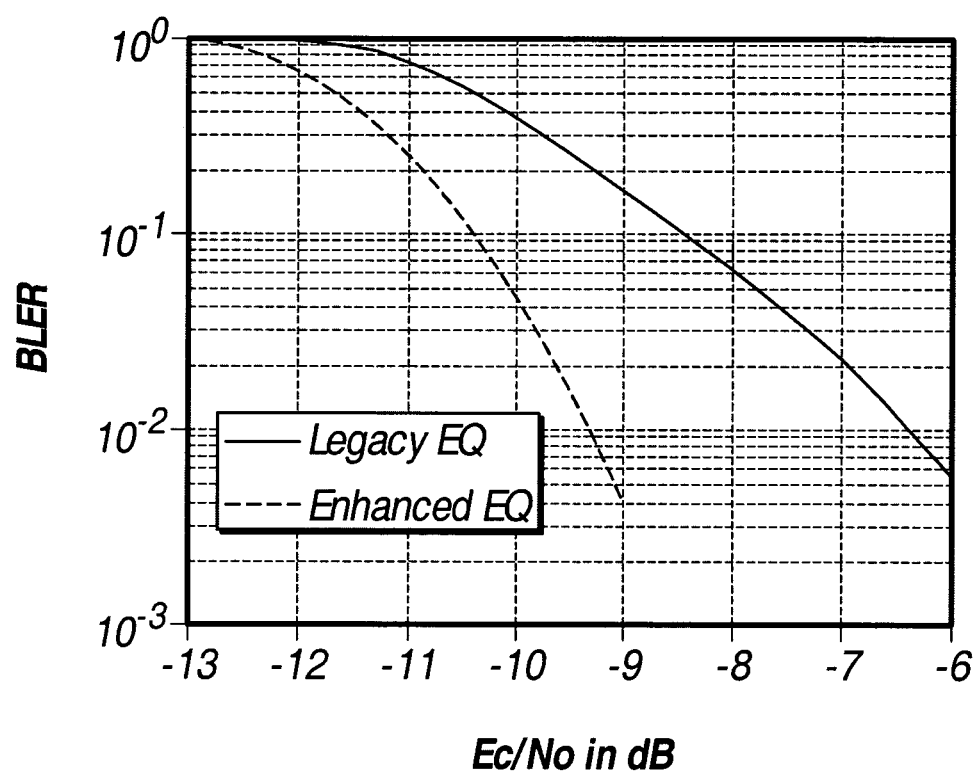
FIG. 4 is a graph of the block error rate for various chip-SNR values for an embodiment of the invention using 1 code reuse and a 3 km/h vehicular-A multipath channel model.

As illustrated in FIG. 4, simulations of the block error rate (BLER) performances between the traditional equalizer (legacy EQ) and the enhanced equalizer (enhanced EQ) are compared for various chip-SNR values, Ec/No. The simulations were run for 4 transmit (or, M=4) antennas 114 and 4 receive (or, N=4) antennas 116. The encoding, rate-matching, interleaving, constellation mapping and the receiver counterparts are configured according to the 3GPP HSDPA HS-DSCH specification. In the HS-DSCH, the chip rate is 3.84 Mcps, the frame length (or, block length) is 2 ms, SF is 16, and the number of modulation symbols per spreading code per frame is 480 for each antenna 114. The modulation constellation is fixed to QPSK in the simulation. Thus, the total number of coded bits transmitted in the frame through the 4 antennas 114 using J spreading codes is 3840J. The 4 transmit antennas 114 are set to use the same set of J spreading codes and the same amount of transmit chip energy, Ec/M, is evenly divided and allocated to the J code channels of each antenna 114.

For simplicity, no overhead channels (e.g., common pilot channel, control channels, voice channels, etc.) were modeled in the simulation. Thus, the total BS transmit chip energy, Ior, is equal to the HS-DSCH chip energy, Ec. The turbo code in the 3GPP HSDPA specification is used for encoding and the code rate is kept to be about 1/3 through the simulation. The carrier frequency is set to 2 GHz. The background noise components for the 4 receive antennas 116 were modeled by spatially-uncorrelated white Gaussian random processes of power spectral density of $N_0$. The chip-spaced equalizer 118 (i.e., oversamping factor P is set to 1), with the perfect synchronization and the perfect estimation of channel coefficients and noise covariance, was used in the simulation. The space-time equalizer time span E and the target delay D were set to 3L chips and 2L−1 chips when the multipath delay spans L chips.

FIG. 4 shows the BLER performance for single code reuse in a 3 km/h vehicular-A model (6 paths, BS angular spread of 2 degrees, MS angular spread of 35 degrees, BS antenna spacing of 10 wavelengths, MS antenna spacing of 0.5 wavelength) of the standard SCM link-level description. The corresponding information data rate was set to 640 kbps, and the number of coded bits is 3840. In the single code case, as illustrated in FIG. 4, at the block error rate (BLER) of $10^{-2}$, there is a gain of approximately 3 dB.

It is observed that the gain from the enhanced equalizer decreases as the number of codes increases. As the number of codes approaches SF, the power balance between the on-time inter-stream interference part and the multipath interference and background noise part of (16) becomes closer to that of the traditional equalizer of (8). Thus, there is a smaller improvement for 15 codes than for a single code.

The traditional chip-level MMSE weighting vector (8) provides a smaller signal to noise ratio than the enhanced MMSE weighting vector (16) for MIMO multi-code CDMA reusing the same codes in different transmit antennas 114. As we see in the comparison between (8) and (16), the two weighting vectors steer in different directions even after compensating the scaling factors. In an embodiment, the on-time inter-stream interference is the critical component. Thus, the enhanced MMSE weighting vector that considers the despreading effect is preferred.

Those of skill in the art will understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present invention.

The various illustrative logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, conventional processor, controller, microcontroller, state machine, etc. A processor can also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium known in the art. A storage medium is coupled to the processor such the processor can read information from, and write information to, the storage medium. In the alternative, the storage medium may be integral to the processor. The processor and the storage medium can reside in an ASIC. The ASIC can reside in a user terminal. In the alternative, the processor and the storage medium can reside as discrete components in a user terminal.

The modules can include, but are not limited to, any of the following: software or hardware components such as software object-oriented software components, class components and task components, processes, methods, functions, attributes, procedures, subroutines, segments of program code, drivers, firmware, microcode, circuitry, data, databases, data structures, tables, arrays, or variables.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method comprising:
receiving a plurality of signals via a plurality of receive antennas, wherein the received signal from each receive antenna comprises a combination of one or more signals transmitted from a transmitter unit, wherein receiving a plurality of signals comprises receiving the plurality of signals via the plurality of receive antennas, wherein the received signal from each receive antenna comprises the combination of one or more signals transmitted from a plurality of transmit antennas; and
processing the signal with a weighting vector having coefficients to generate a plurality of bit streams, wherein the coefficients are at least in part a function of spreading factor and are obtained by accounting for spreading code reuse by a transmitter, wherein processing the signal comprises processing the signal with the weighting vector having coefficients to generate a plurality of groups of equalized metric sequences corresponding to the plurality of transmit antennas.

2. The method of claim 1, wherein said processing the signal comprises generating a plurality of chip sequences with a space-time equalizer.

3. The method of claim 1 wherein the weighting vector is a minimum mean square error (MMSE) weighting vector.

4. The method of claim 1 further comprising separating the equalized metric sequences of each group into a plurality of modulation symbol sequences.

5. A CDMA receiver comprising:
means for equalizing operably connected to a plurality of receive antennas, wherein the means for equalizing applies a weighting vector comprising coefficients that are a function of a spreading factor and are obtained by accounting for spreading code reuse by a transmitter, wherein the means for equalizing produces a plurality of groups of equalized metric sequences corresponding to a plurality of transmit antennas; and
means for despreading operably connected to the means for equalizing, wherein the means for despreading separates equalized metric sequences into a plurality of modulation symbol sequences.

6. The receiver of claim 5 wherein the means for equalizing comprises a circuit configured to apply the weighting vector comprising the coefficients.

7. The receiver of claim 5 wherein the means for equalizing comprises a processor configured to apply the weighting vector comprising the coefficients.

8. The receiver of claim 5 further comprising a means for receiving signals reusing at least one spreading code from a plurality of transmit antennas.

9. The receiver of claim 5 wherein the means for equalizing comprises a plurality of groups of filters corresponding to the plurality of transmit antennas.

10. The receiver of claim 9 wherein each group of filters comprises a plurality of filters corresponding to the plurality of receive antennas and operably connected to the receive antennas, each filter producing a filtered output.

11. The receiver of claim 10 wherein the filters comprise two-dimensional filters.

12. The receiver of claim 10 wherein each group of filters comprises a means for adding.

13. The receiver of claim 12 wherein the means for adding sums the filtered outputs in the group of filters to generate the equalized metric sequence.

14. A CDMA receiver comprising:
means for equalizing operably connected to a plurality of receive antennas, wherein the means for equalizing applies a weighting vector comprising coefficients that are a function of a spreading factor and are obtained by accounting for spreading code reuse by a transmitter; and
means for despreading operably connected to the means for equalizing, wherein the means for despreading separates equalized metric sequences into a plurality of modulation symbol sequences, wherein the means for despreading comprises a circuit configured to separate the equalized metric sequences into the plurality of modulation symbol sequences.

15. A CDMA receiver comprising:
means for equalizing operably connected to a plurality of receive antennas, wherein the means for equalizing applies a weighting vector comprising coefficients that are a function of a spreading factor and are obtained by accounting for spreading code reuse by a transmitter; and
means for despreading operably connected to the means for equalizing, wherein the means for despreading separates equalized metric sequences into a plurality of modulation symbol sequences, wherein the means for despreading comprises a processor configured to separate the equalized metric sequences into the plurality of modulation symbol sequences.

16. An apparatus, comprising:
means for receiving a plurality of signals via a plurality of receive antennas, wherein the received signal from each receive antenna comprises a combination of one or more signals transmitted from a transmitter unit, wherein the means for receiving a plurality of signals comprises means for receiving the plurality of signals via the plurality of receive antennas, wherein the received signal from each receive antenna comprises the combination of one or more signals transmitted from a plurality of transmit antennas; and
means for processing the signal with a weighting vector having coefficients to generate a plurality of bit streams, wherein the coefficients are at least in part a function of spreading factor and are obtained by accounting for spreading code reuse by a transmitter, wherein the means for processing the signal comprises means for processing the signal with the weighting vector having coefficients to generate a plurality of groups of equalized metric sequences corresponding to the plurality of transmit antennas.

* * * * *